(12) United States Patent
Skaalen (10) Patent No.: US 7,860,448 B2
(45) Date of Patent: Dec. 28, 2010

(54) METHODS AND COMPUTER PROGRAMS FOR LOCALIZING BROADCAST CONTENT

(75) Inventor: Skeet Skaalen, Omaha, NE (US)

(73) Assignee: Excelsior Radio Networks, LLC, New York, NY (US)

( * ) Notice: Subject to any disclaimer, the term of this patent is extended or adjusted under 35 U.S.C. 154(b) by 1170 days.

(21) Appl. No.: 11/244,668

(22) Filed: Oct. 5, 2005

(65) Prior Publication Data

US 2007/0079328 A1    Apr. 5, 2007

(51) Int. Cl.
*H04H 20/74* (2008.01)
(52) U.S. Cl. .................... 455/3.02; 455/3.01; 455/3.03; 455/3.06
(58) Field of Classification Search ....... 455/3.01–3.03, 455/3.06, 427, 414.1, 12.1, 13.2, 98; 725/38–63
See application file for complete search history.

(56) References Cited

U.S. PATENT DOCUMENTS

| | | | | |
|---|---|---|---|---|
| 4,430,753 A | * | 2/1984 | Shiratani | 455/165.1 |
| 5,247,440 A | * | 9/1993 | Capurka et al. | 701/49 |
| 5,508,733 A | | 4/1996 | Kassatly | |
| 5,694,334 A | | 12/1997 | Donahue et al. | |
| 5,819,160 A | * | 10/1998 | Foladare et al. | 455/45 |
| 5,864,546 A | | 1/1999 | Campanella | |
| 5,870,390 A | | 2/1999 | Campanella | |
| 5,982,411 A | * | 11/1999 | Eyer et al. | 725/49 |
| 6,006,173 A | | 12/1999 | Wiese et al. | |
| 6,049,551 A | | 4/2000 | Hinderks et al. | |
| 6,088,349 A | * | 7/2000 | Zumkeller | 370/345 |
| 6,094,671 A | | 7/2000 | Chase et al. | |
| 6,101,180 A | | 8/2000 | Donahue et al. | |
| 6,115,366 A | | 9/2000 | Campanella et al. | |
| 6,160,797 A | | 12/2000 | Robert, III et al. | |
| 6,163,683 A | | 12/2000 | Dunn et al. | |
| 6,201,798 B1 | | 3/2001 | Campanella et al. | |
| 6,212,201 B1 | | 4/2001 | Hinderks et al. | |
| 6,262,982 B1 | | 7/2001 | Donahue et al. | |
| 6,266,339 B1 | | 7/2001 | Donahue et al. | |
| 6,298,088 B1 | * | 10/2001 | Bhatt et al. | 375/240.28 |
| 6,332,163 B1 | | 12/2001 | Bowman-Amuah | |
| 6,373,374 B1 | * | 4/2002 | Siemens | 340/309.8 |
| 6,385,647 B1 | | 5/2002 | Willis et al. | |
| 6,411,607 B1 | | 6/2002 | Robert, III et al. | |
| 6,411,616 B1 | | 6/2002 | Donahue et al. | |
| 6,477,370 B1 | | 11/2002 | Sigler et al. | |
| 6,522,635 B1 | | 2/2003 | Bedwell | |

(Continued)

OTHER PUBLICATIONS

Waitt Radio Networks, "LocalLive-Boomer Oldies"; Document No. R1-APL-DL-NAC, Rev. Feb. 17, 2002; 1 page.

*Primary Examiner*—Duc M. Nguyen
*Assistant Examiner*—Dominic E Rego
(74) *Attorney, Agent, or Firm*—Jeffer Mangels Butler & Mitchell LLC (57) ABSTRACT

In one embodiment, a computer-implemented method 1) prompts a user for a description of localized broadcast content that is to be broadcast by a particular broadcast affiliate, and 2) transmits the description of the localized broadcast content to a broadcast content provider. In another embodiment, a computer-implemented method 1) receives a request for localized broadcast content specifying a particular broadcast affiliate; 2) retrieves a description of the localized broadcast content associated with the particular broadcast affiliate; and 3) displays the description of the localized broadcast content to a recording artist.

28 Claims, 13 Drawing Sheets

U.S. PATENT DOCUMENTS

| | | |
|---|---|---|
| 6,542,480 B1 | 4/2003 | Campanella |
| 6,574,338 B1 | 6/2003 | Sachdev |
| 6,574,794 B1 | 6/2003 | Sarraf |
| 6,577,716 B1 | 6/2003 | Minter et al. |
| 6,590,529 B2 | 7/2003 | Schwoegler |
| 7,274,906 B1 * | 9/2007 | Nguyen et al. ............. 455/3.05 |
| 7,706,838 B2 * | 4/2010 | Atsmon et al. .............. 455/558 |
| 7,715,782 B2 * | 5/2010 | van Hoff et al. ........... 455/3.02 |
| 2001/0018766 A1 * | 8/2001 | Morita et al. ................ 725/32 |
| 2001/0025377 A1 | 9/2001 | Hinderks |
| 2001/0034664 A1 * | 10/2001 | Brunson ....................... 705/26 |
| 2002/0067730 A1 | 6/2002 | Hinderks et al. |
| 2002/0097728 A1 | 7/2002 | Hinderks et al. |
| 2002/0105955 A1 | 8/2002 | Roberts, III et al. |
| 2002/0124271 A1 * | 9/2002 | Herrmann et al. .......... 725/151 |
| 2002/0177914 A1 * | 11/2002 | Chase ........................ 700/94 |
| 2002/0191116 A1 * | 12/2002 | Kessler et al. .............. 348/723 |
| 2002/0194364 A1 | 12/2002 | Chase et al. |
| 2003/0030750 A1 * | 2/2003 | Hoarty et al. ............... 348/461 |
| 2003/0065581 A1 * | 4/2003 | Takada ........................ 705/26 |
| 2003/0084457 A1 * | 5/2003 | Lee et al. ................... 725/117 |
| 2003/0093794 A1 * | 5/2003 | Thomas et al. ................ 725/46 |
| 2003/0153329 A1 * | 8/2003 | Stefan et al. ................ 455/456 |
| 2003/0172381 A1 * | 9/2003 | Janevski ...................... 725/46 |
| 2003/0194199 A1 * | 10/2003 | Roth ........................... 386/46 |
| 2003/0237098 A1 * | 12/2003 | Yamaguchi et al. ......... 725/117 |
| 2004/0010372 A1 * | 1/2004 | Schwoegler ................... 702/3 |
| 2004/0117831 A1 * | 6/2004 | Ellis et al. ..................... 725/53 |
| 2004/0205829 A1 * | 10/2004 | Hane, III .................... 725/135 |
| 2004/0215394 A1 * | 10/2004 | Carpenter et al. ............ 702/3 |
| 2004/0215483 A1 * | 10/2004 | Fixman ......................... 705/1 |
| 2004/0268419 A1 * | 12/2004 | Danker et al. ............... 725/136 |
| 2005/0028206 A1 * | 2/2005 | Cameron et al. .............. 725/46 |
| 2005/0060759 A1 * | 3/2005 | Rowe et al. ................. 725/143 |
| 2005/0273834 A1 * | 12/2005 | De Sousa .................... 725/117 |
| 2006/0029109 A1 * | 2/2006 | Moran ........................ 370/538 |
| 2006/0080171 A1 * | 4/2006 | Jardins et al. ................ 705/14 |
| 2007/0250597 A1 * | 10/2007 | Resner et al. ................ 709/218 |
| 2008/0037658 A1 * | 2/2008 | Price et al. ............. 375/240.26 |
| 2008/0147410 A1 * | 6/2008 | Odinak ..................... 704/270.1 |
| 2008/0172396 A1 * | 7/2008 | Banerjee et al. .............. 707/10 |
| 2008/0319828 A1 * | 12/2008 | Southam et al. .............. 705/10 |

* cited by examiner

METHODS AND COMPUTER PROGRAMS FOR LOCALIZING BROADCAST CONTENT

BACKGROUND

A broadcast network, as defined herein, is a network wherein one or more content providers deliver audio, visual, or multimedia content to a plurality of affiliates, each of which broadcasts its received content to a multitude of listeners or viewers. One example of such a broadcast network is a radio network.

If a broadcast affiliate does not employ its own recording artist (e.g., a disc jockey or on-air personality), some of the content that is provided to the broadcast affiliate may be localized content. Localized broadcast content may comprise, for example, local content (such as local advertisements, and local announcements relating to sports, concerts and contests), pre-local content (such as station identifications, advertisements for recurring program segments, and other local information that does not change as often as locals) and weather content (such as forecasts).

The conventional way in which a broadcast affiliate transmits a description of localized content to a broadcast content provider is via fax or email. A recording artist employed by the content provider then records the localized content, and causes the recorded content to be transmitted back to the affiliate.

BRIEF DESCRIPTION OF THE DRAWINGS

Illustrative embodiments of the invention are illustrated in the drawings, in which.

DETAILED DESCRIPTION

Figure 1:
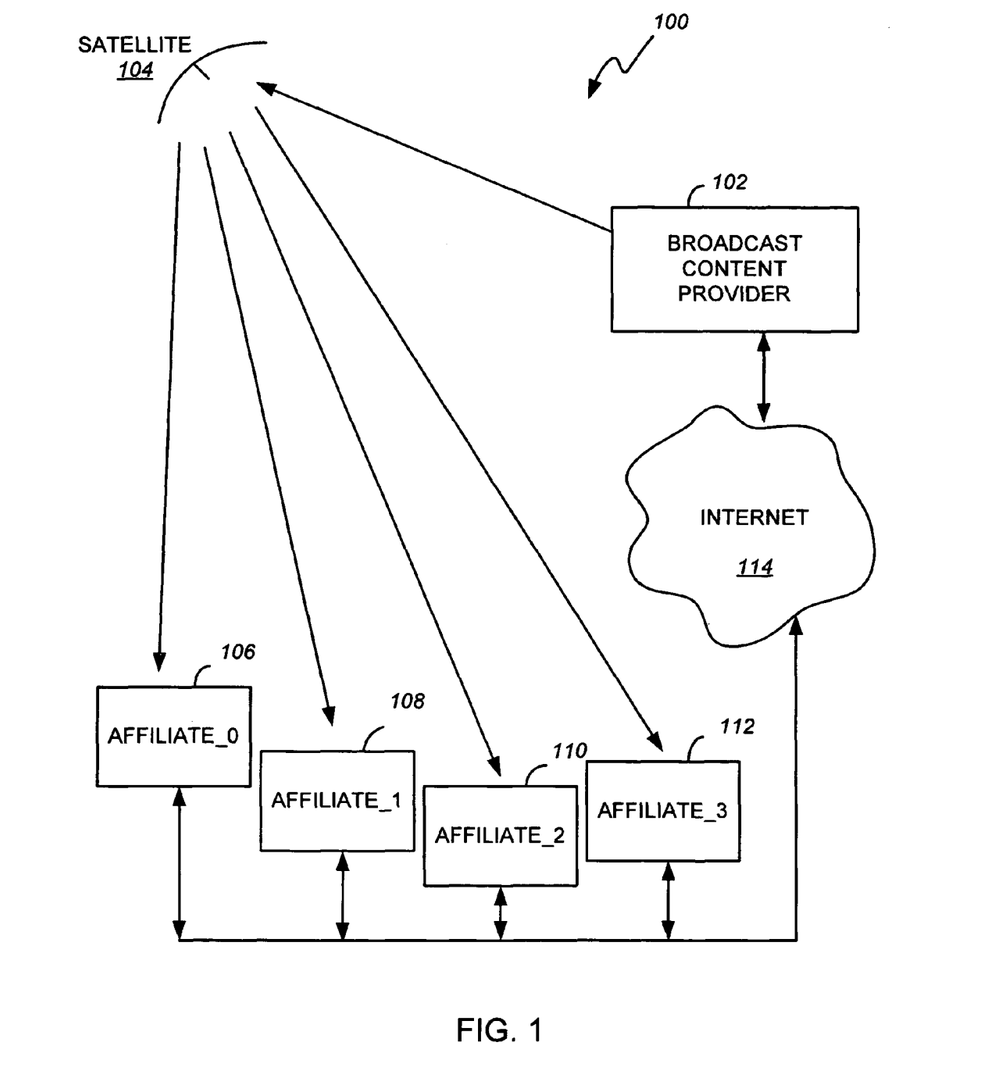
FIG. 1 illustrates an exemplary broadcast network.

FIG. 1 illustrates a network 100 wherein a broadcast content provider 102 transmits content to each of a number of broadcast affiliates 106, 108, 110, 112 via a satellite-based content delivery system (i.e., via satellite 104). The content is provided to each of the affiliates in the form of discrete content files. Optionally, one or more content files may be "packaged" or "encapsulated" for delivery via the satellite delivery system. However, what is ultimately received by each of the affiliates is a number of discrete content files. After delivery, an automation system at each affiliate retrieves, plays and broadcasts at least some of its received files in accordance with one or more electronic schedules. In this manner, each affiliate generates a near real-time broadcast. As will be explained in more detail later in this description, each affiliate may be provided with different content files and a different electronic schedule (or schedules).

In one embodiment of the network 100, each of the affiliates 106, 108, 110, 112 is an affiliate radio station. In an alternate embodiment of the network 100, the satellite 104 could be replaced (or supplemented) with another content delivery system, such as the Internet 114.

Exemplary embodiments of the network 100 are further described in the United States Published Patent Application of Tim Valley, et al. entitled, "Systems, Methods and Apparatus for Operating a Broadcast Network" (Pub. No. 2005/0159104 A1).

If a broadcast affiliate does not employ its own recording artist (e.g., a disc jockey), some of the content that is provided to a broadcast affiliate may be localized content. Localized broadcast content may comprise, for example, local content (such as local advertisements, and local announcements relating to sports, concerts and contests); pre-local content (such as station identifications, advertisements for recurring program segments, and other local information that does not change as often as locals); and weather content.

In a network such as that which is shown in FIG. 1, there are at least three steps to providing a broadcast affiliate with localized content. First, a description of the localized content must be obtained by an affiliate and transmitted to the broadcast content provider. Next, a recording artist employed by the broadcast content provider must read and record the localized content. Finally, the broadcast content provider must transmit the recorded content to the affiliate. Exemplary methods and apparatus for completing the first two of these steps are disclosed below. Exemplary methods and apparatus for completing the last of these steps are described in Pub. No. 2005/0159104 A1, referenced supra.

Figure 2:
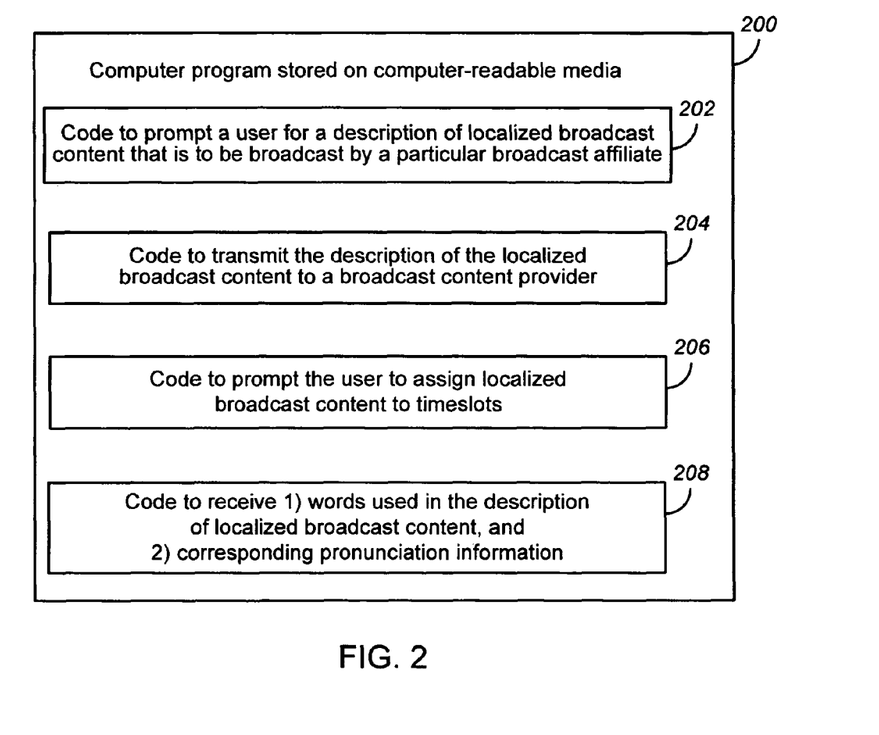
FIG. 2 illustrates a new and exemplary computer program for transmitting localized content to a broadcast content provider.

The conventional way in which a broadcast affiliate transmits a description of localized content to a broadcast content provider is via fax or email. However, when a plurality of recording artists are recording information for a plurality of different affiliates, routing faxes to the right recording artist, and enabling a recording artist to easily locate the right fax, becomes difficult. Emails can be easier to route; however, similarly to faxed information, it can be difficult for a recording artist to easily locate and open the right email when it is time to record localized content. FIG. 2 therefore illustrates a new and exemplary computer program 200 for transmitting localized content to a broadcast content provider 102 (FIG. 1).

The computer program 200 comprises 1) code 202 to prompt a user for a description of localized broadcast content that is to be broadcast by a particular broadcast affiliate (e.g., affiliate 106), and 2) code 204 to transmit a received description of the localized broadcast content to a broadcast content provider 102.

In one embodiment, the computer program 200 may be executed over a network (e.g., the Internet 114) and may prompt a user for a description of localized broadcast content via a web browser. In another embodiment, the computer program 200 may be executed locally to a broadcast affiliate's site, and the computer program 200 may prompt the user for a description of localized broadcast content via a web browser or other interface.

The description of localized broadcast content received by the computer program 200 may be transmitted to the broadcast content provider 102 in various ways, such as, for example, by means of the Internet 114 or by means of a satellite link 104.

The computer program 200 may be stored on computer-readable media comprising, for example, one or more fixed or removable disks that are located at a single computer station. The computer-readable media may also comprise one or more random-access or read-only memories RAMS or ROMs).

The computer program 200 may prompt a user for descriptions of various and plural types of localized broadcast content, such as local content, pre-local content, weather sponsors, weather content, and override content.

Figure 3:
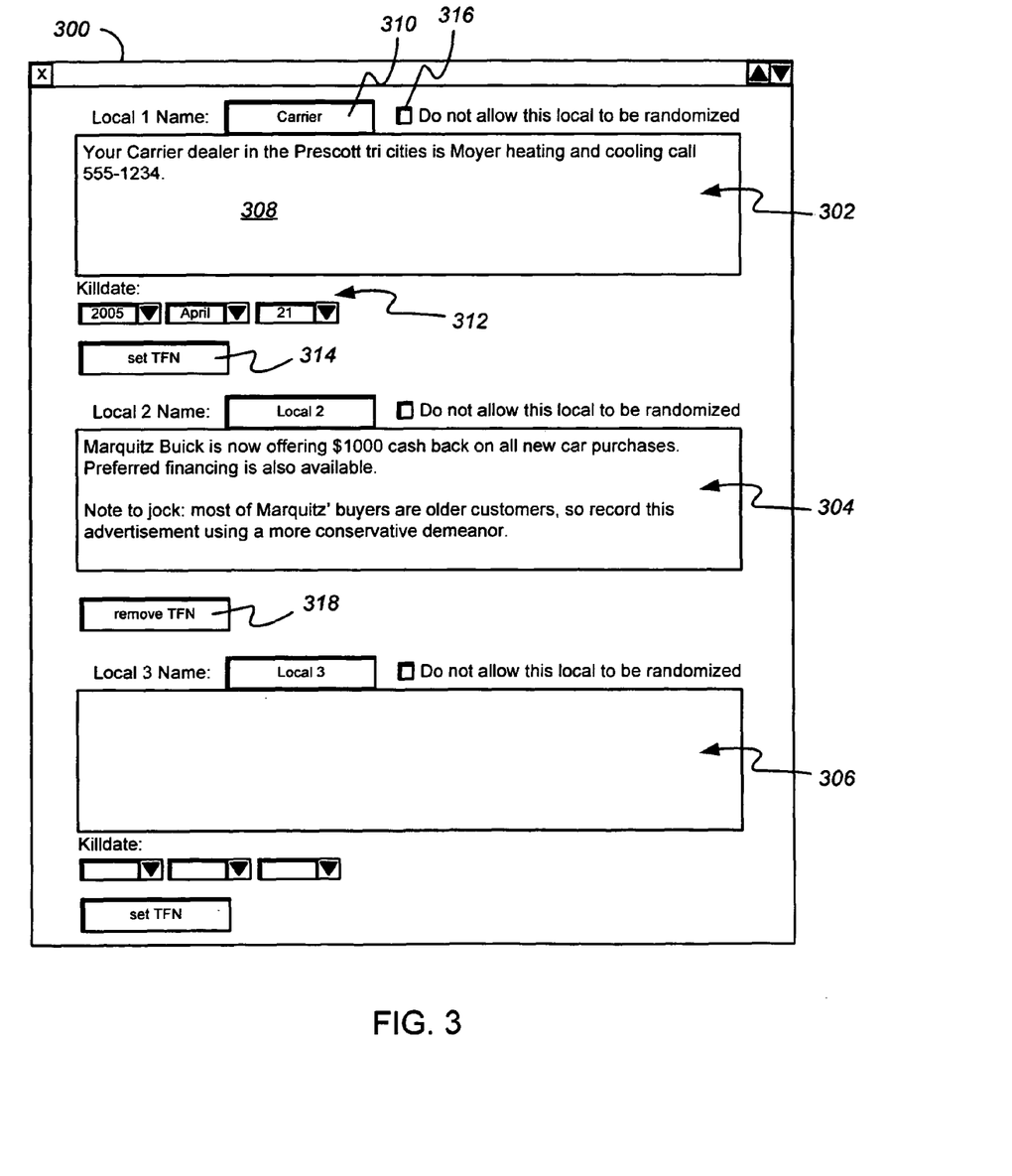
FIG. 3 illustrates an exemplary interface through which the program shown in FIG. 2 may prompt a user for local content.

FIG. 3 illustrates an exemplary interface 300 through which the code 202 may prompt a user for local content. The interface 300 comprises fields for receiving a plurality of local content elements. The fields corresponding to each of a plurality of local content elements 302, 304, 306 comprise 1) a text field 308 for receiving a description of localized broadcast content (e.g., a local advertisement or a local announcement); 2) a text field 310 in which a user may provide a user-friendly name that is to be associated with the localized content; and 3) scheduling information 312, 314, 316 pertaining to the localized content. One piece of scheduling information may be a kill date 312. The kill date 312 may be set, for example, by selecting a day, month and year from a plurality of pull-down menu options. Alternately, an option to override the kill date 312 by, for example, pressing a "set TFN" (till further notice) push-button 314 may be provided. If a user later decides to schedule a specific kill date 312, the user may graphically press a "remove TFN" push-button 318.

The scheduling information may further comprise an option (e.g., a checkbox 316) to allow or disallow randomized scheduling of a local content element 302. The effect of choosing to allow or disallow randomized scheduling for a local content element will become clearer later in this description.

By way of example, an interface for receiving weather sponsors may be structured similarly to the interface 300 for receiving local content 302, 304, 306 (as illustrated in FIG. 3).

Figure 4:
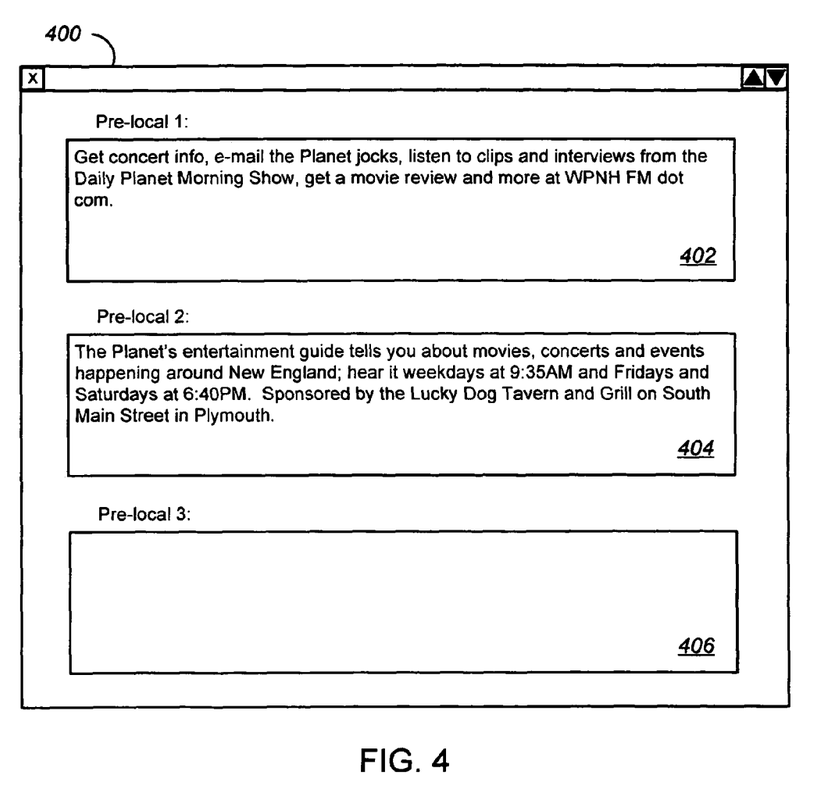
FIG. 4 illustrates an exemplary interface through which the program shown in FIG. 2 may prompt a user for pre-local content.

FIG. 4 illustrates an exemplary interface 400 through which the code 202 may prompt a user for pre-local content 402, 404, 406. Unlike local content 302, 304, 306 and weather sponsors, which are typically only relevant (or paid for) for a limited time, pre-locals 402, 404, 406 are intended to comprise information that changes only rarely, such as station identifications and advertisements for recurring program segments. As a result, the interface 400 does not comprise any sort of means to receive scheduling information, and rather only comprises a plurality of text fields to receive descriptions of pre-local content 402, 404, 406.

Figure 5:
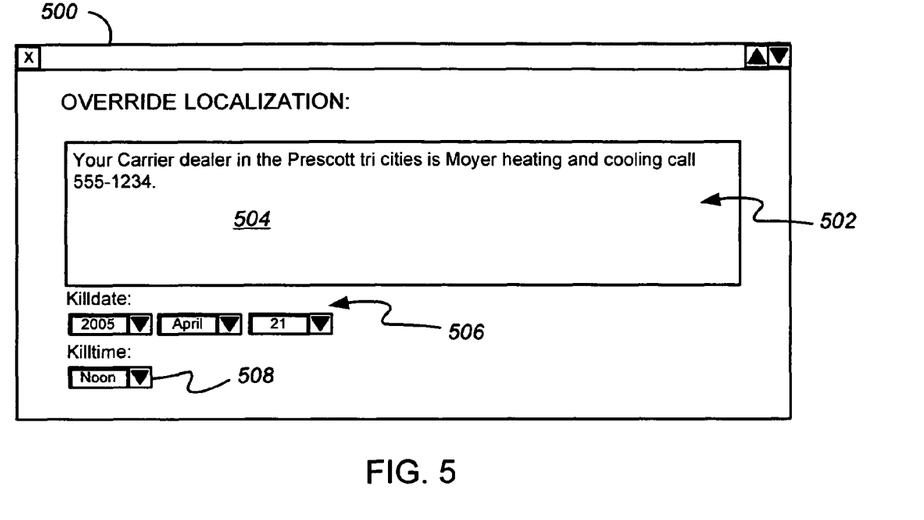
FIG. 5 illustrates an exemplary interface through which the program shown in FIG. 2 may prompt a user for override content.

FIG. 5 illustrates an exemplary interface 500 through which the code 202 may prompt a user for override content. Similarly to a local content element 302, the override content element 502 comprises a text field 504 for receiving override content, and an option 506 for specifying a kill date. In addition, the override content element 502 is associated with a kill time 508 (since overrides are typically of very limited duration). A main difference between the local content element 302 and the override content element 502, however, is that the override content will supersede all other localized broadcast content until the override content's kill date 506 and kill time 508 is reached. The override content element 502 is especially useful for storm warnings and other "breaking news" of a critical nature.

Figure 6:
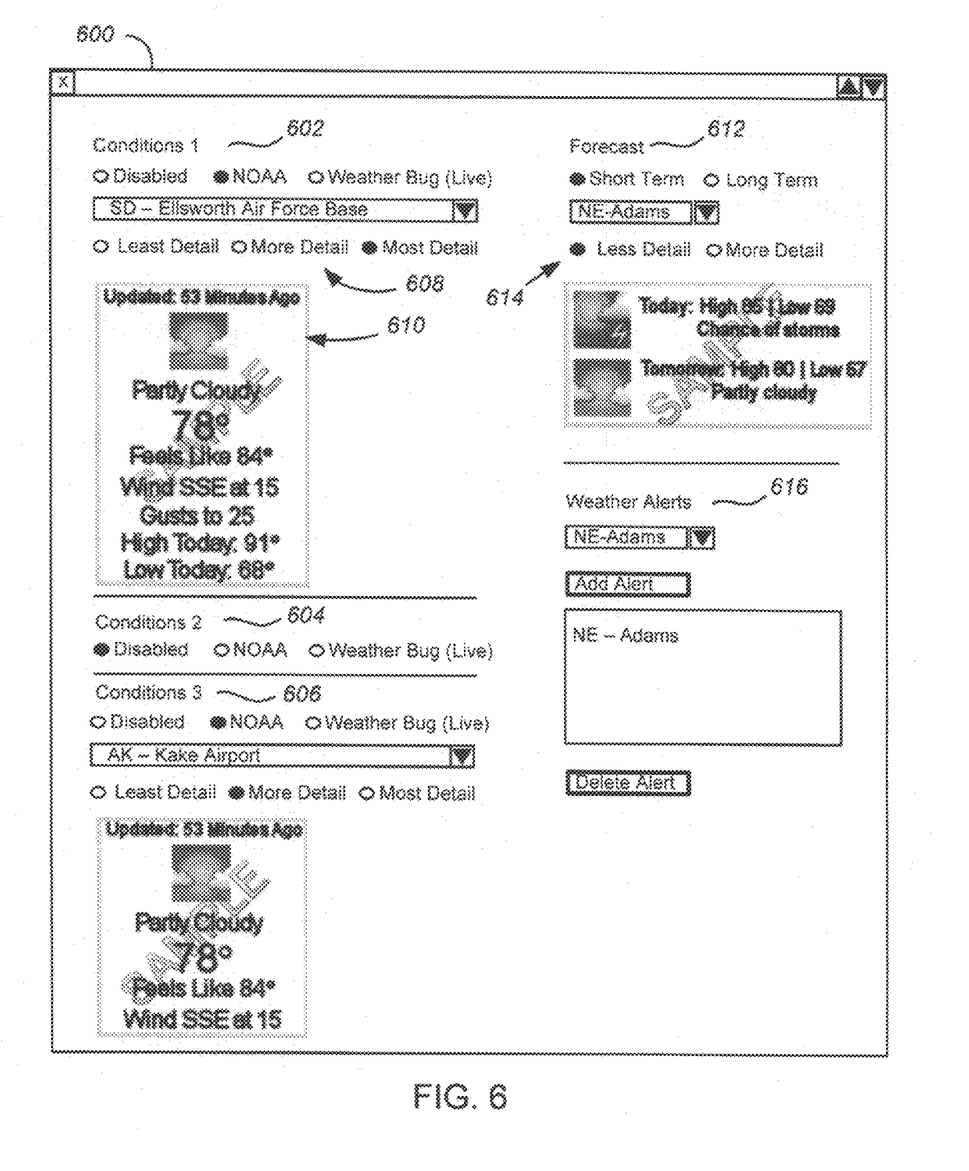
FIGS. 6 & 7 illustrate exemplary interfaces through which the program shown in FIG. 2 may prompt a user for weather content.
Figure 7:
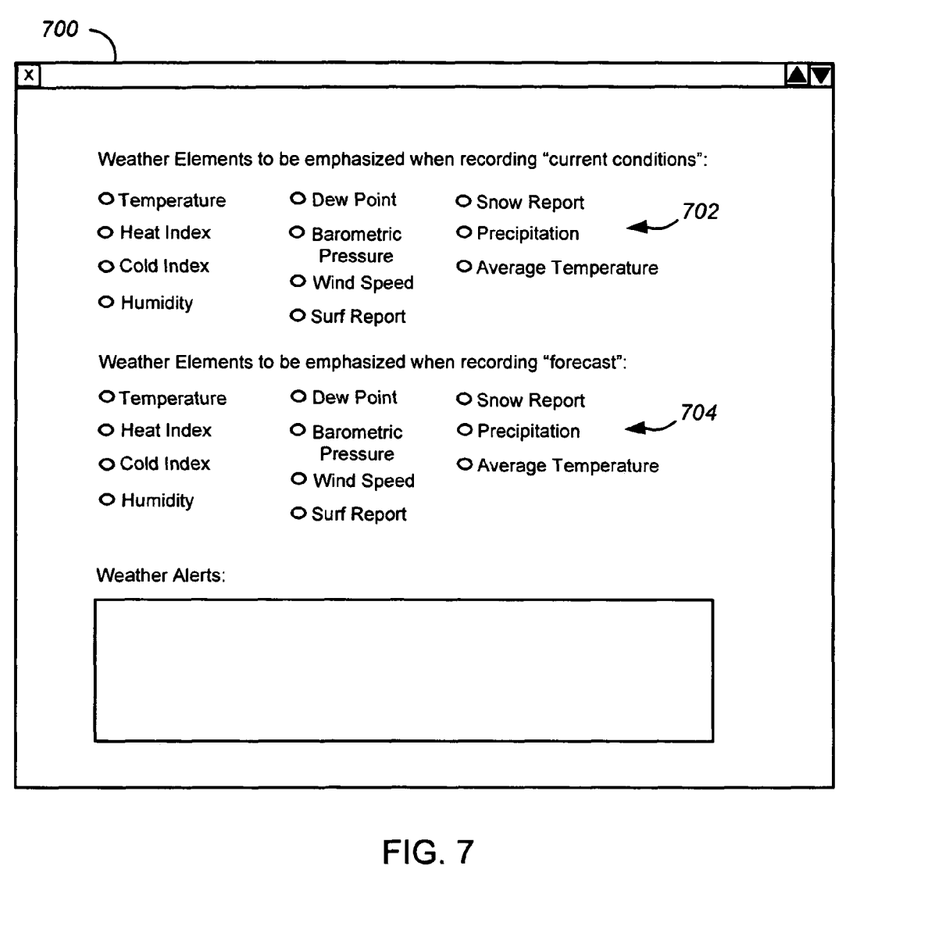

FIGS. 6 & 7 illustrate exemplary interfaces 600, 700 through which the code 202 may prompt a user for weather content. By way of example, each of the interfaces 600, 700 prompts a user to build a weather forecast. As used in this sense, a weather forecast includes not only a forecast of future weather conditions and alerts, but also a summary of current weather conditions.

Using the interface 600 shown in FIG. 6, a user builds a forecast by selecting from predetermined levels of weather content. For example, for each of a number of weather "conditions" 602, 604, 606, the user may select a weather source (e.g., NOAA or Weather Bug), a city, and a level of detail 608 (i.e., how many conditions 610 the user would like a recording artist to draw from when recording localized weather content). The user may further select a city and a level of detail 614 for a weather forecast 612, and may select a number of cities (e.g., cities within a broadcast region) for which the user would like a recording artist to cover "weather alerts" 616.

It is noted that the forecast built using the interface 600 does not include current or predicted weather content, but instead comprises elements and levels of detail that a computer program running at a broadcast content provider's site may use to build a weather forecast with "then current conditions". That is, the conditions displayed via the interface 600 are exemplary only, and are not part of the information that is saved for transmittal to a broadcast content provider.

Using the interface 700 shown in FIG. 7, a user builds a forecast by selecting a number of individual weather elements 702, 704 that a recording artist should focus on when recording localized weather content.

Figure 8:
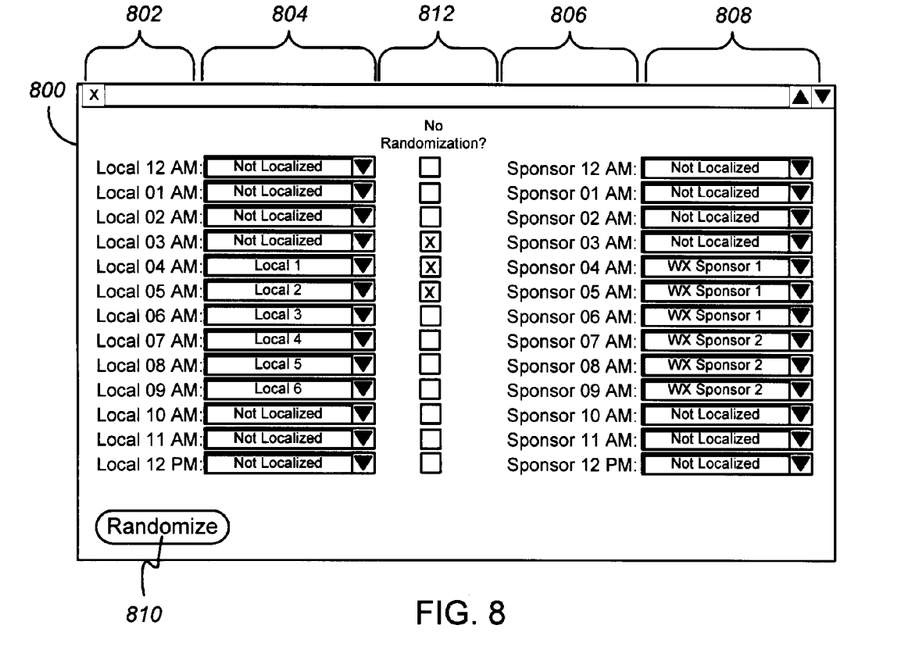
FIG. 8 illustrates an exemplary interface through which the program shown in FIG. 2 may prompt a user to assign localized broadcast content to timeslots.

The computer program 200 shown in FIG. 2 may further comprise code 206 to prompt a user to assign localized broadcast elements 302, 304, 306 (FIG. 3) to timeslots. In one embodiment, a user may be prompted to assign each localized broadcast element 302, 304, 306 to a timeslot when the localized broadcast element 302, 304, 306 is entered (e.g., the interface 300 shown in FIG. 3 could prompt a user to assign each element of local content 302, 304, 306 to a timeslot). However, the assignment of localized broadcast content to timeslots 802, 806 is preferably integrated in an interface 800 such as that which is shown in FIG. 8.

The interface 800 prompts a user to assign combinations of local content elements 804 and sponsors 808 to timeslots 802, 806. By way of example, local content elements 804 and sponsors 808 are shown to be selectable by means of pull-down selection menus for each timeslot 802, 806. The names displayed in the pull-down menus may be the user-friendly names that a user assigns to content elements using, for example, the interface 300.

The interface 800 is also shown to implement a randomization scheduling feature 810, 812. That is, by checking boxes 812 next to the timeslots 802 to which local content elements 804 are assigned, a user may allow or disallow the random assignment of content elements to the timeslots 802. Then, and upon a user's press of a "Randomize" push-button 810, localized content is randomly assigned to any timeslot for which randomization is allowed. It is also noted that some timeslots 802 may be left un-localized and/or un-sponsored (both indicated by "Not Localized" in FIG. 8).

Figure 9:
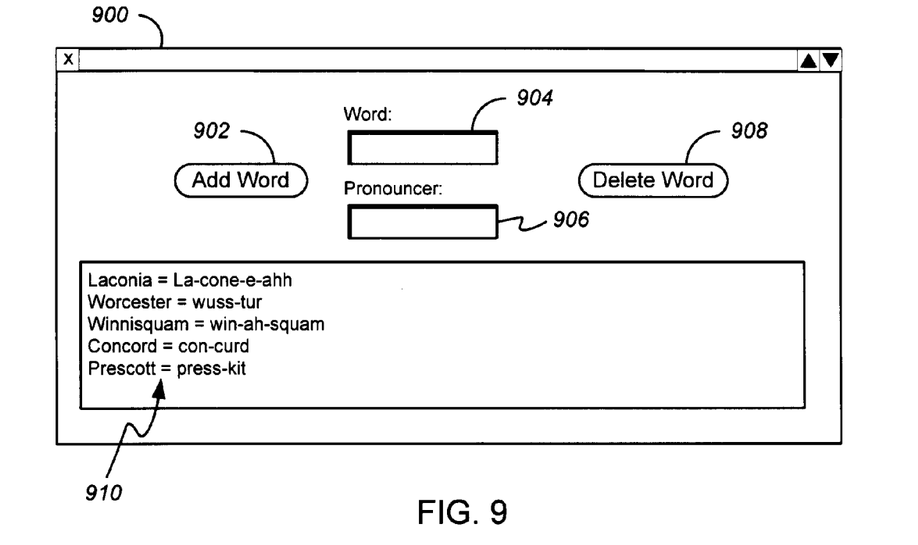
FIG. 9 illustrates an exemplary "Pronouncer" interface that may be display by the program shown in FIG. 2.

The computer program 200 may also comprise code 208 to receive 1) words used in the description of localized broadcast content, and 2) corresponding pronunciation information. One way in which this may be done is via the "Pronouncer" interface 900 shown in FIG. 9, in which words and their corresponding pronunciations are entered in the fields 904 and 906, and then added to the Pronouncer's database 910 (e.g., by pressing an "Add Word" push-button 902). Words may also be deleted from the database 910 (e.g., by pressing a "Delete Word" push-button 908). Alternately, a user might be provided with an option to record an audio pronunciation.

Figure 10:
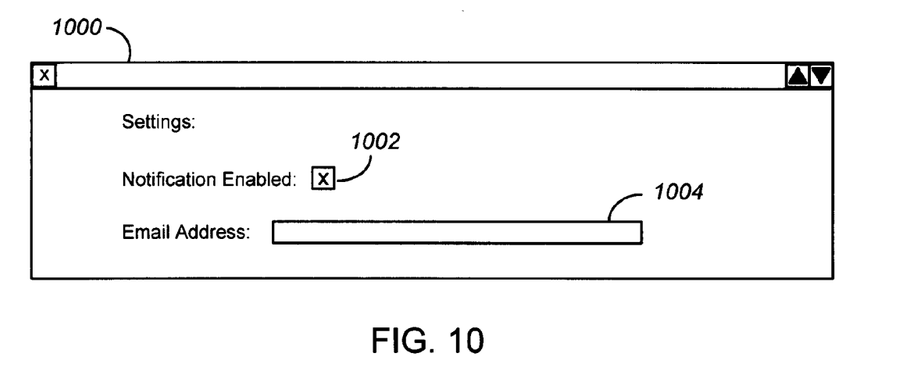
FIG. 10 illustrates an exemplary interface through which the program shown in FIG. 2 may prompt a user to set "affiliate notification settings"

The computer program 200 may comprise code to prompt a user for various other pieces of information. For example, FIG. 10 illustrates an interface 1000 where a user can set "affiliate notification settings". In one embodiment, the interface 1000 comprises a check box 1002 via which a user may indicate whether notifications should be enabled, and a text field 1004 for receiving the user's email address.

Figure 11:
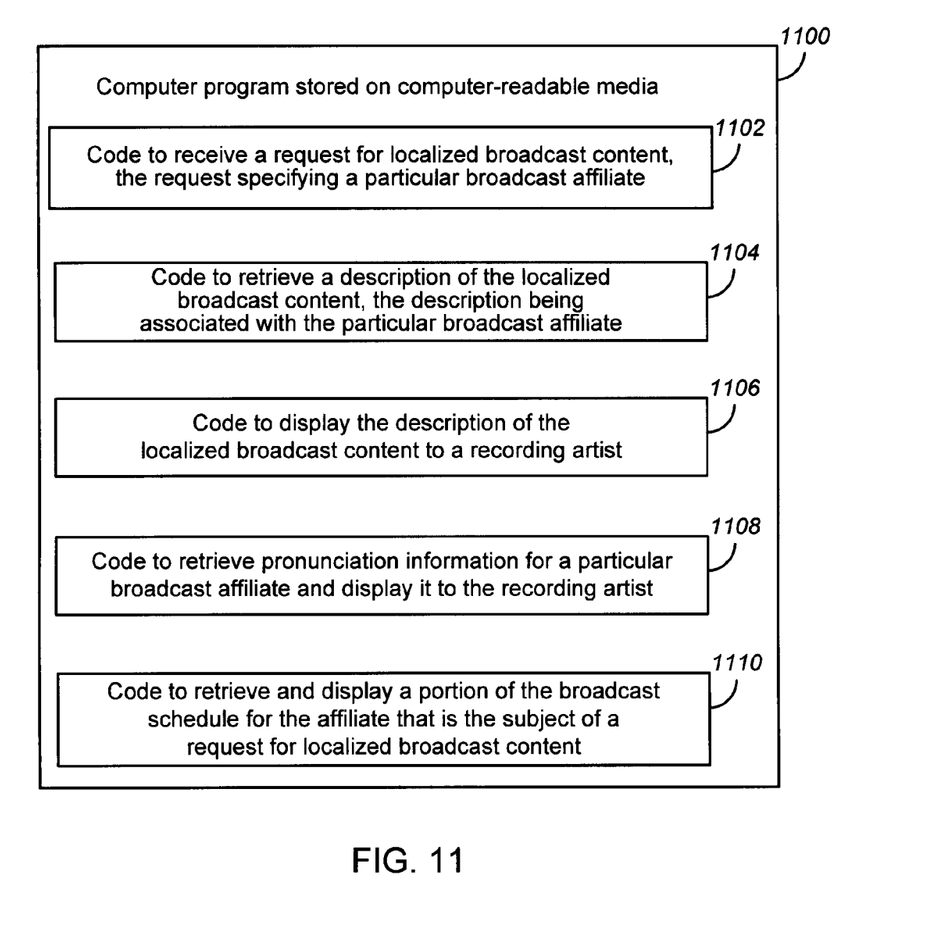
FIG. 11 illustrates a new and exemplary computer program for displaying localized broadcast content to a recording artist.

FIG. 11 illustrates a new and exemplary computer program 1100 for displaying localized broadcast content to a recording artist. The computer program 1100 comprises 1) code 1102 to receive a request for localized broadcast content, the request specifying a particular broadcast affiliate; 2) code 1104 to retrieve a description of the localized broadcast content, the description being associated with the particular broadcast affiliate; and 3) code 1106 to display the description of the localized broadcast content to a recording artist.

Figure 12:
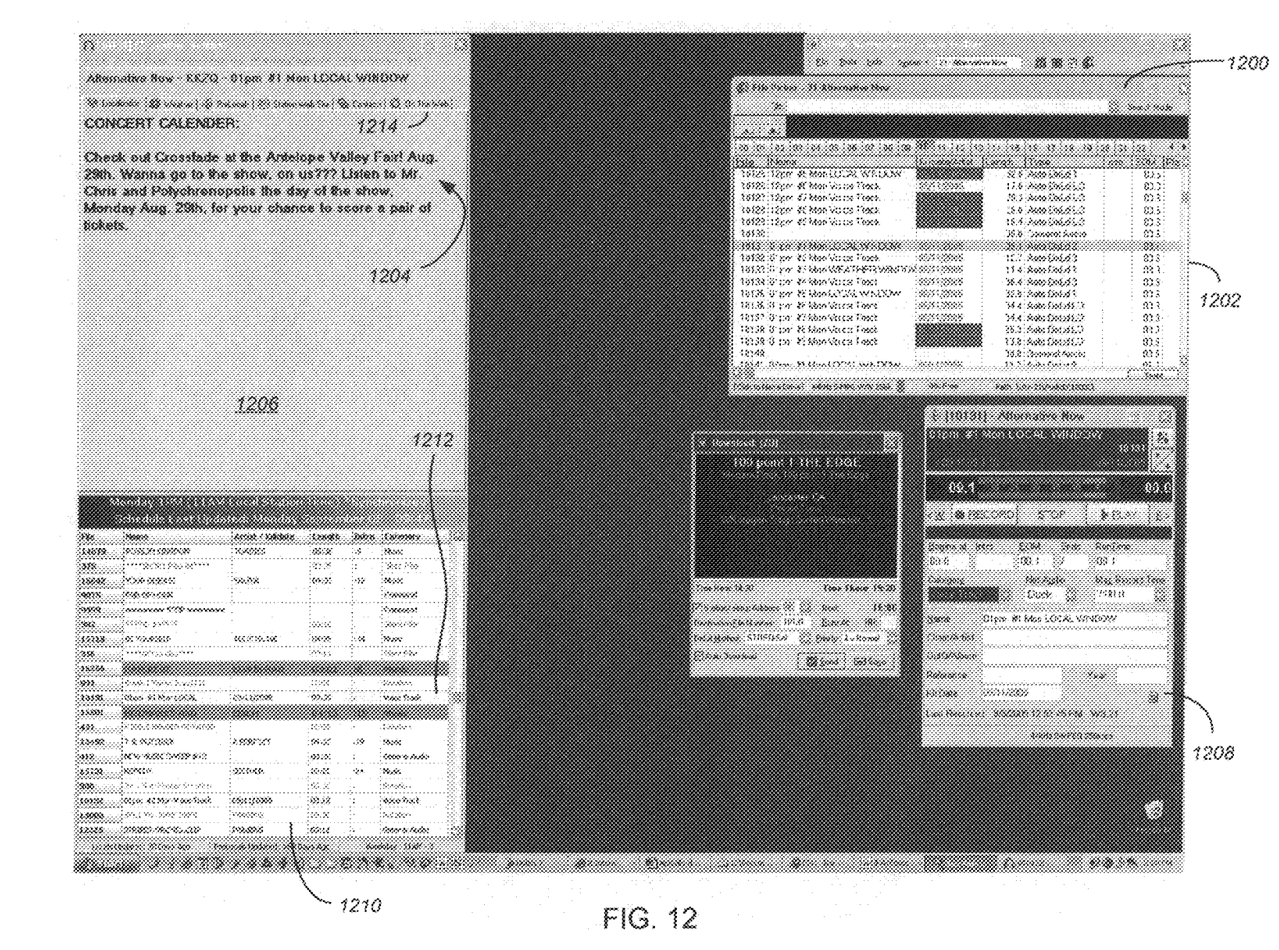
FIG. 12 illustrates an exemplary state of an interface for the program shown in FIG. 11.

The code 1104 to receive the request for localized broadcast content may receive such a request from a program that is used to record and schedule broadcast content. An example of such software is described in Pub. No. 2005/0159104 A1, referenced supra; and an exemplary screen 1200 of such software is shown in FIG. 12.

In one embodiment, a schedule 1202 displayed by the recording program is affiliate-neutral. For example, it may reference music that is to be broadcast by all affiliates of a "like" format. However, all of the information that is displayed in the schedule 1202 should be assigned a timeslot and/or a file number.

Upon a recording artist's selection of 1) a particular timeslot (or file number), and 2) a particular broadcast affiliate via the screen 1200, a request for localized broadcast content may be sent to the program 1100. Upon receiving this request, the program 1100 may retrieve corresponding descriptions of localized broadcast content that were provided via the program 200. The retrieved information 1204 may then be displayed to the recording artist via the interface 1206 (FIG. 12), and the recording artist may use this information to record appropriate localized broadcast content for the timeslot (or file number) that was selected via the recording program (e.g., via screen 1208).

In addition to retrieving a description of localized broadcast content, the program 1100 may comprise code 1108 (FIG. 11) to retrieve pronunciation information for a particular broadcast affiliate (possibly generated by the Pronouncer shown in FIG. 9) and display it to the recording artist. In one embodiment, the code 1108 may 1) parse the description of the localized broadcast content, and 2) insert the pronunciation information 1300 into the displayed description of the localized broadcast content. See FIG. 13. In another (or the same) embodiment, the program 1100 may comprise code to A) retrieve and display pronunciation information for a particular broadcast affiliate, and B) upon selection of the pronunciation information (e.g., by double-clicking on it, or a button associated it), play an audio recording of the pronunciation information to the recording artist.

The program 1100 may further comprise code 1110 to retrieve and display a portion of the broadcast schedule 1210 for the affiliate that is the subject of a request for localized broadcast content. In this manner, a recording artist may appreciate the context of a local content element that is to be recorded. In some embodiments, and as shown in FIG. 12, the timeslot 1212 for which a local content element is going to be recorded may be highlighted (with other adjacent timeslots being highlighted in the same or different colors).

Figure 13:
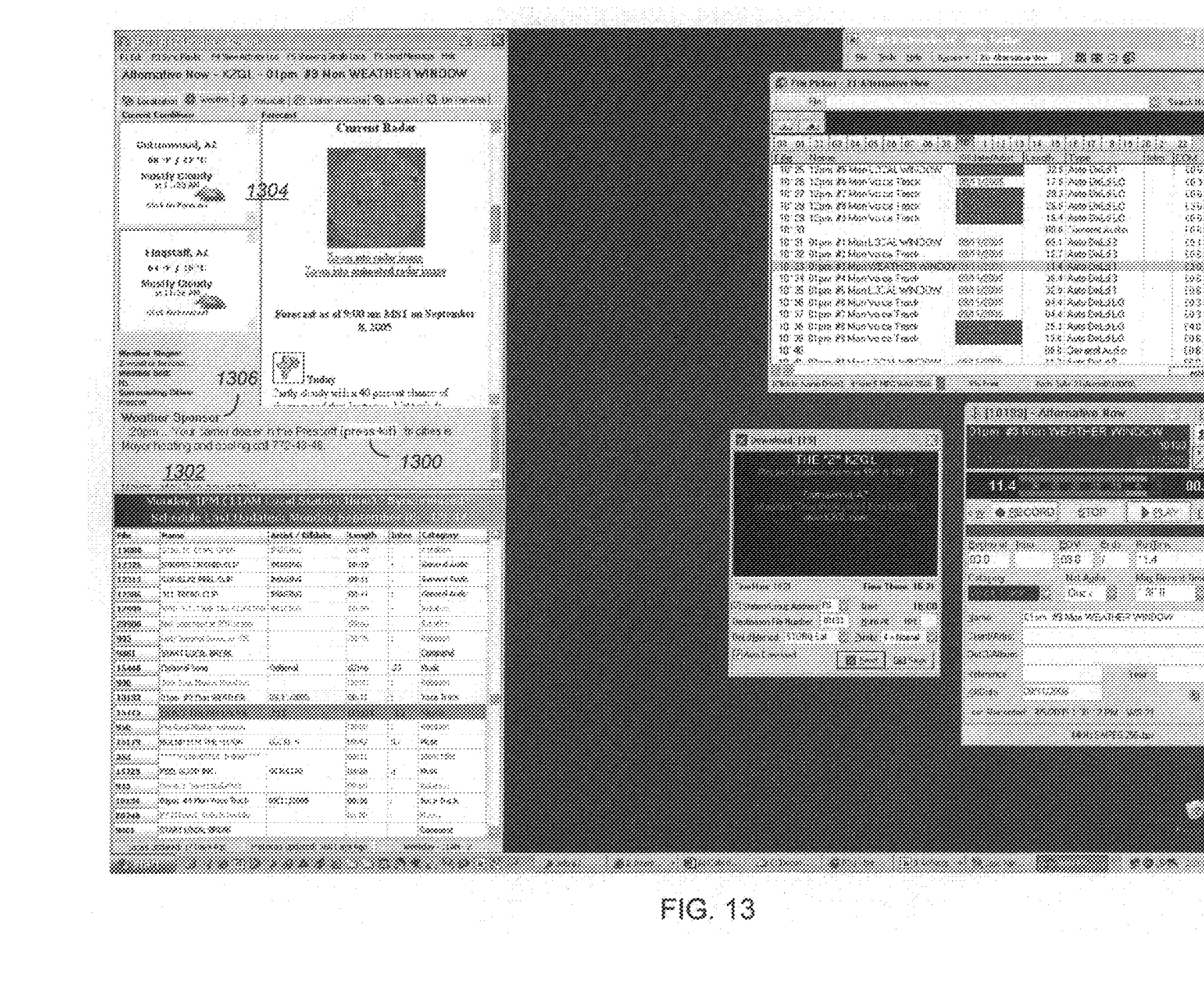
FIG. 13 illustrates an exemplary state of the interface shown in FIG. 12 when a request for localized broadcast content indexes weather content.

FIG. 13 illustrates an exemplary state of the interface 1302 for the program 1100 when a request for localized broadcast content indexes weather content 1304. In the case of a request for weather content, the program 1100 may retrieve both weather content information 1304 and weather sponsor information 1306. In one embodiment, the weather content information 1304 is retrieved from web-based sources, in accord with weather forecast information compiled using the program 200.

Figure 14:
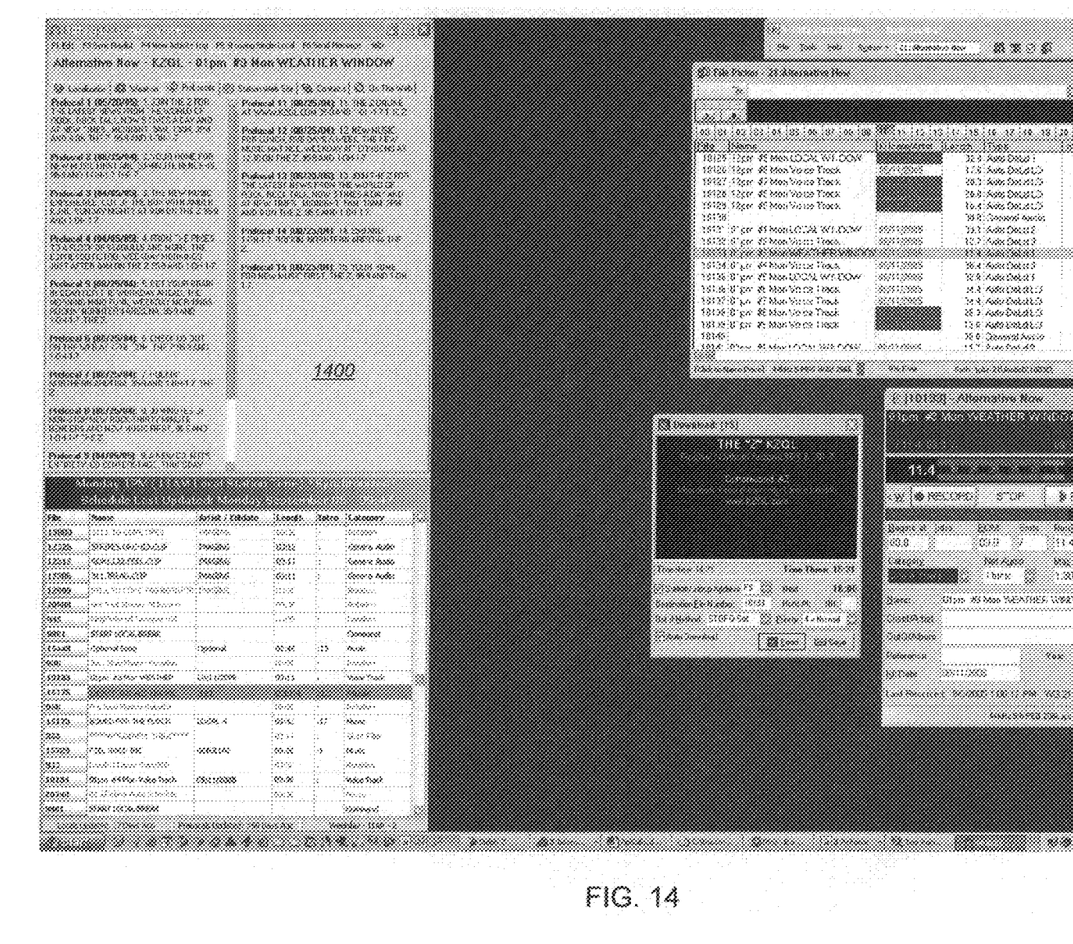
FIG. 14 illustrates the display of pre-local information via the interface shown in FIG. 12.

By way of example, FIG. 14 illustrates the display of pre-local information 1400 by the program 1100.

As indicated by the tab 1214 in the interface 1200 of the program 1100 labeled "On the Web" (FIG. 12), the program 1100 may enable a recording artist to quickly link to a uniform resource locator (URL) associated with content that provides context for localized broadcast content. The content to which the URL links may be information such as a website for an affiliate, its home city, an affiliate sponsor or advertiser, or any other information relevant to the recording of localized broadcast content.

Figure 15:
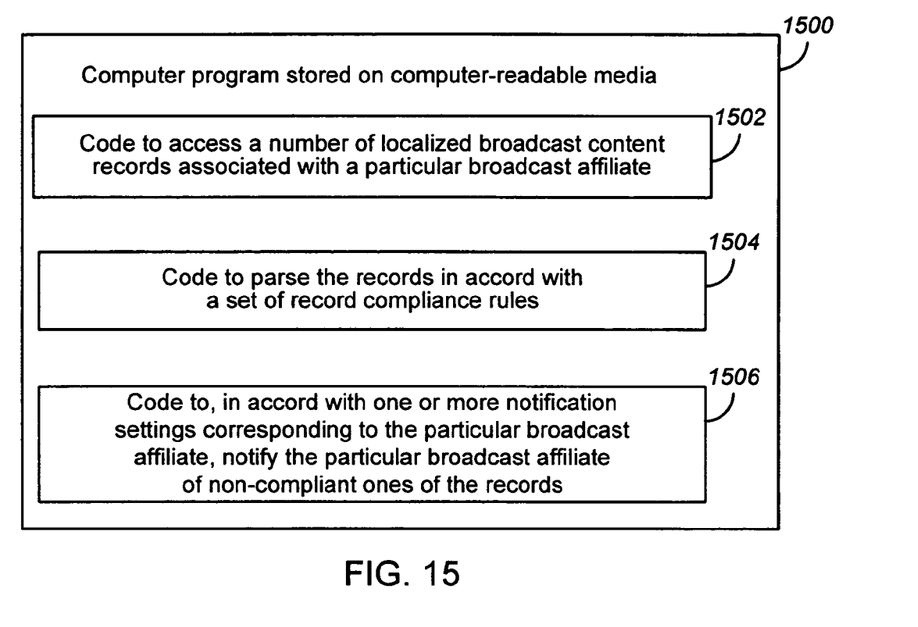
FIGS. 15 & 16 illustrate exemplary computer programs that may be used to provide notifications to the programs shown in FIGS. 2 & 11, or to coordinate actions between the programs shown in FIGS. 2 & 11.

FIG. 15 illustrates a computer program 1500 that may operate in conjunction with the programs 200 and 1100. The program 1500 comprises 1) code 1502 to access a number of localized broadcast content records associated with a particular broadcast affiliate; 2) code 1504 to parse the records in accord with a set of record compliance rules; and 3) code 1506 to, in accord with one or more notification settings corresponding to the particular broadcast affiliate, notify the particular broadcast affiliate of non-compliant ones of the records. By way of example, the set of record compliance rules may comprise rules to identify outdated records (e.g., records whose kill dates have expired), or rules to identify empty records.

Figure 16:
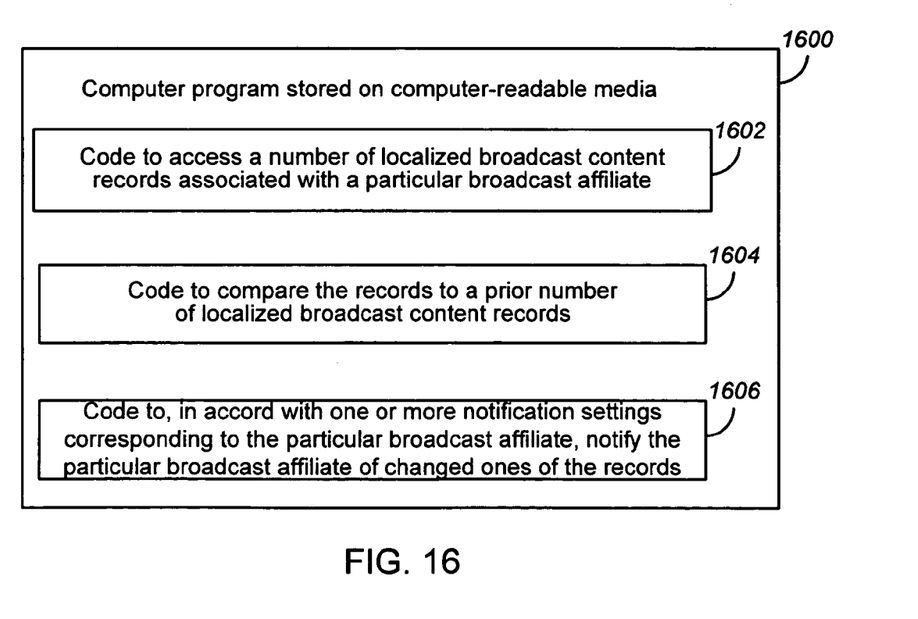

FIG. 16 illustrates another computer program 1600 that may operate in conjunction with the programs 200 and 100 (and which may be integrated with the program 1500). The program 1600 comprises 1) code 1602 to access a number of localized broadcast content records associated with a particular broadcast affiliate; 2) code 1604 to compare the records to a prior number of localized broadcast content records; and 3) code 1606 to, in accord with one or more notification settings corresponding to the particular broadcast affiliate, notify the particular broadcast affiliate of changed ones of the records. The program 1600 may also notify a broadcast content provider of changed ones of the records.

What is claimed is:

1. A computer program stored on computer-readable media, comprising:
   computer program code to,
   prompt a first user for a description of first localized broadcast content that is to be broadcast by a first broadcast affiliate;
   transmit the description of the first localized broadcast content to a broadcast content provider;

prompt a second user for a description of second localized broadcast content that is to be broadcast by a second broadcast affiliate;

transmit the description of the second localized broadcast content to the broadcast content provider, wherein the first localized broadcast content is different than the second localized broadcast content;

prompt a recording artist to record the first localized broadcast content, thereby creating first recorded content;

prompt a recording artist to record the second localized broadcast content, thereby creating second recorded content;

transmit the first recorded content to the first broadcast affiliate; and transmit the second recorded content to the second broadcast affiliate.

2. The computer program of claim 1, wherein the code to prompt the first and second users for the descriptions of the first and second localized broadcast content comprises code to prompt the user for at least one of i) local content, ii) pre-local content, and iii) sponsors.

3. The computer program of claim 1, wherein the code to prompt the first and second users for the descriptions of the first and second localized broadcast content comprises code to prompt the first and second users for weather content.

4. The computer program of claim 3, wherein the code to prompt the first and second users for weather content further comprises code to prompt the first and second users to build a weather forecast by selecting from predetermined levels of weather content.

5. The computer program of claim 3, wherein the code to prompt the first and second users for weather content comprises code to prompt the first and second users to build a weather forecast from selectable weather elements.

6. The computer program of claim 1, wherein the code to prompt the first and second users for the descriptions of the first and second localized broadcast content comprises code to prompt the first and second users for names to associate with different elements of the first and second localized broadcast content.

7. The computer program of claim 1, wherein the code to prompt the first and second users for the descriptions of the first and second localized broadcast content comprises code to prompt the first and second users for local content and sponsors; and wherein the computer program code further comprises code to prompt the first and second users for kill dates to associate with different elements of the local content and sponsors.

8. The computer program of claim 1, wherein the code to prompt the first and second users for the descriptions of the first and second localized broadcast content comprises code to prompt the first and second users for localized override content and an associated kill date and kill time, the localized override content overriding all other localized broadcast content until the kill date and kill time.

9. The computer program of claim 1, further comprising code to prompt the first and second users to assign localized broadcast content to timeslots.

10. The computer program of claim 1, wherein the code to prompt the first and second users for the descriptions of the first and second localized broadcast content comprises code to prompt the first and second users for local content and sponsors; and wherein the computer program code further comprises code to prompt the first and second users to assign combinations of the local content elements and sponsors to timeslots.

11. The computer program of claim 1, further comprising code to prompt the first and second users with an option to randomize an assignment of elements of the description of localized broadcast content to timeslots.

12. The computer program of claim 11, further comprising code to prompt the first and second users to select which of the timeslots are subject to the randomization option.

13. The computer program of claim 1, wherein the code to prompt the first and second users for the descriptions of the first and second localized broadcast content comprises code to receive i) words used in the description of localized broadcast content, and ii) corresponding pronunciation information.

14. The computer program of claim 13, wherein the pronunciation information comprises text.

15. The computer program of claim 13, wherein the pronunciation information comprises audio.

16. The computer program of claim 1, wherein the code to prompt the first and second users for the description of the first and second localized broadcast content performs said prompting via a web browser.

17. A computer program stored on computer-readable media, comprising:

computer program code to, receive a request for first localized broadcast content, the request specifying a first broadcast affiliate;

retrieve a description of the first localized broadcast content, the description being associated with the first broadcast affiliate;

display the description of the first localized broadcast content to a first recording artist, wherein the first recording artist records the first localized broadcast content, thereby creating first recorded broadcast content;

transmit the first recorded broadcast content to the first broadcast affiliate;

receive a request for second localized broadcast content, the request specifying a second broadcast affiliate;

retrieve a description of the second localized broadcast content, the description being associated with the second broadcast affiliate; and display the description of the second localized broadcast content to a second recording artist, wherein the first localized broadcast content is different than the second localized broadcast content, wherein the second recording artist records the second localized broadcast content, thereby creating second recorded broadcast content; and transmit the second recorded broadcast content to the second broadcast affiliate.

18. The computer program of claim 17, further comprising code to retrieve pronunciation information for the first and second broadcast affiliates and display the pronunciation information to the first and second recording artists.

19. The computer program of claim 18, wherein the code to display the pronunciation information i) parses the description of the first and second localized broadcast content, and ii) inserts the pronunciation information into the displayed description of the first and second localized broadcast content.

20. The computer program of claim 17, further comprising code to i) retrieve and display pronunciation information for the first and second broadcast affiliates, and ii) upon selection of the pronunciation information, play an audio recording of the pronunciation information to the first and second recording artists.

21. The computer program of claim 17, wherein: the requests for first and second localized broadcast content further specify a timeslot; and the retrieved descriptions of the first and second localized broadcast content corresponds to the timeslot.

22. The computer program of claim 21, further comprising code to i) retrieve and display a portion of a broadcast schedule for the first and second broadcast affiliates, and ii) highlight the timeslot specified in the requests for first and second localized broadcast content.

23. The computer program of claim 21, wherein the timeslot is specified inferentially, by specification of a file number corresponding to the timeslot.

24. The computer program of claim 17, wherein: the requests for first and second localized broadcast content are requests for weather content; and the code to retrieve the description of the first and second localized broadcast content retrieves weather content information and weather sponsor information.

25. The computer program of claim 24, wherein the weather forecast information comprises information retrieved from web-based sources.

26. A computer-implemented method, comprising:
prompting a first user for a description of first localized broadcast content that is to be broadcast by a first broadcast affiliate;
transmitting the description of the first localized broadcast content to a broadcast content provider,
prompting a second user for a description of second localized broadcast content that is to be broadcast by a second broadcast affiliate; and
transmitting the description of the second localized broadcast content to the broadcast content provider, wherein the first localized broadcast content is different than the second localized broadcast content
prompting a recording artist to record the first localized broadcast content, thereby creating first recorded content,
prompting a recording artist to record the second localized broadcast content, thereby creating second recorded content,
transmitting the first recorded content to the first broadcast affiliate, and
transmitting the second recorded content to the second broadcast affiliate.

27. The computer-implemented method of claim 26, wherein prompting the first and second users for the descriptions of the first and second localized broadcast content comprises prompting the first and second users for i) local content, ii) pre-local content, and iii) sponsors.

28. A computer-implemented method, comprising:
receiving a request for first localized broadcast content, the request specifying a first broadcast affiliate;
retrieving a description of the first localized broadcast content, the description being associated with the first broadcast affiliate;
displaying the description of the first localized broadcast content to a first recording artist, wherein the first recording artist records the first localized broadcast content, thereby creating first recorded broadcast content,
transmitting the first recorded broadcast content to the first broadcast affiliate,
receiving a request for second localized broadcast content, the request specifying a second broadcast affiliate;
retrieving a description of the second localized broadcast content, the description being associated with the second broadcast affiliate; and
displaying the description of the second localized broadcast content to a second recording artist, wherein the first localized broadcast content is different than the second localized broadcast content, wherein the second recording artist records the second localized broadcast content, thereby creating second recorded broadcast content, and
transmitting the second recorded broadcast content to the second broadcast affiliate.

* * * * *